United States Patent [19]
Briles

[11] 3,849,964
[45] Nov. 26, 1974

[54] CORROSION BLOCKING FASTENER

[76] Inventor: Franklin S. Briles, 3600 Catamaran, Corona Del Mar, Calif.

[22] Filed: Aug. 15, 1973

[21] Appl. No.: 388,386

[52] U.S. Cl. .................... 52/758 F, 85/1 R, 85/9 R, 85/43
[51] Int. Cl. .......................... F16b 35/06, F16b 5/00
[58] Field of Search ............ 52/617, 758 F; 85/9 R, 85/43, 37, 1 R; 285/211, 212; 408/223–225

[56] References Cited
UNITED STATES PATENTS

| | | | |
|---|---|---|---|
| 1,914,516 | 6/1933 | MacPherson | 52/758 F |
| 2,527,616 | 10/1950 | Beckstrom | 52/758 F X |
| 2,572,401 | 10/1951 | Snow | 52/758 F X |
| 2,760,400 | 8/1956 | Mills et al. | 85/9 R |
| 2,801,061 | 7/1957 | Logan | 52/758 F |
| 2,833,325 | 5/1958 | Laisy | 85/9 R X |
| 2,982,166 | 5/1961 | Hobbs | 85/9 R X |
| 3,034,611 | 5/1962 | Zenzic | 85/1 R X |
| 3,298,270 | 1/1967 | Launay | 85/1 R |
| 3,304,109 | 2/1967 | Schuster | 85/1 R X |
| 3,459,447 | 8/1969 | Hurt et al. | 52/758 F |
| 3,512,446 | 5/1970 | Sekhon | 52/758 F X |
| 3,574,080 | 4/1971 | Jones et al. | 85/9 R |
| 3,680,429 | 8/1972 | Briles | 85/37 |
| 3,748,948 | 7/1973 | Schmitt | 85/9 R X |

FOREIGN PATENTS OR APPLICATIONS 997,733  7/1965  Great Britain ................ 85/9 R

OTHER PUBLICATIONS

"Screws, Bolts, and Nuts" Handbook of Fastening & Joining of Metal Parts p. 150, April 20, 1956 Laughner & Hargan

*Primary Examiner*—Ernest R. Purser
*Assistant Examiner*—Leslie A. Braun
*Attorney, Agent, or Firm*—William W. Haefliger

[57] ABSTRACT

An angle headed fastener has controlled interference engagement with the work, along the fastener head and shank, when driven into the work, to provide controlled cold working of the work as well as maximum resistance to corrosive fluid access between the fastener and work.

8 Claims, 3 Drawing Figures

CORROSION BLOCKING FASTENER

BACKGROUND OF THE INVENTION

This invention relates generally to angle headed fasteners, and more particularly concerns the construction of such fasteners to have specialized interference with the work to overcome problems and defects stemming from fastener head reception in work counterbores.

In the past, the use of angle headed fasteners to connect work panels, as for example aluminum or titanium panels as employed in aircraft structures, has given rise to numerous problems. Among these were the practice of providing holes in the work slightly oversize in relation to the outer edges of the received fastener heads. The required removal of such material to produce the oversize holes resulted in undesirable notch sensitivity and reduction of fatigue life of the structure. More importantly, corrosion problems developed; for example, protective material filled into annular recesses about the heads tended to work loose during flexing of aircraft structures, so that corrosive fluids could gain access to the work bore along the fastener length, weakening the structure by producing corrosion and stress corrosion. Also, since the fastener head periphery did not completely engage the work bore due to the oversize relation, the development of desirable radial compression and peripheral tension in and within the elastic limits of the work material about the fastener head was not possible.

SUMMARY OF THE INVENTION

It is a major object of the invention to provide a fastener capable of overcoming the above problems, and also providing unusual advantages as will appear.

One important aspect of the invention concerns the provision of a taper or angle headed fastener in which the head engages the work in a manner to eliminate any deleterious pocket or recess at the immediate periphery of the head, thereby to forestall corrosion that might otherwise develop as a result of collection of corrosive liquid in such a recess or pocket. Also, closer spacing of fasteners is thereby facilitated. In this regard, and as will be seen, the head may have first and second tapered sections proceeding forwardly from the rear face, and the taper angularity of the first section is made such as to have interference engagement with the counterbore along the length of the first section, providing radial compression and peripheral tension. In addition, the taper angularity of the head second section may be so related to the first section and to the work as to have interference engagement with the work counterbore to block forward driving of the fastener into the work at a time when the head rear face is flush with the work panel surface. Such driving causes cold working of the work to fill the gap between the fastener and work, in an outward direction along the length of the second section. Fatigue life is also increased.

It is another object of the invention to provide a fastener, as above described, which has interference engagement with the work everywhere along its length, when fully driven into the work, to provide maximum resistance to corrosive fluid access between the fastener and work.

These and other objects and advantages of the invention, as well as the details of an illustrative embodiment, will be fore fully understood from the following description and drawings, in which:

DRAWING DESCRIPTION

DETAILED DESCRIPTION

Figure 3:
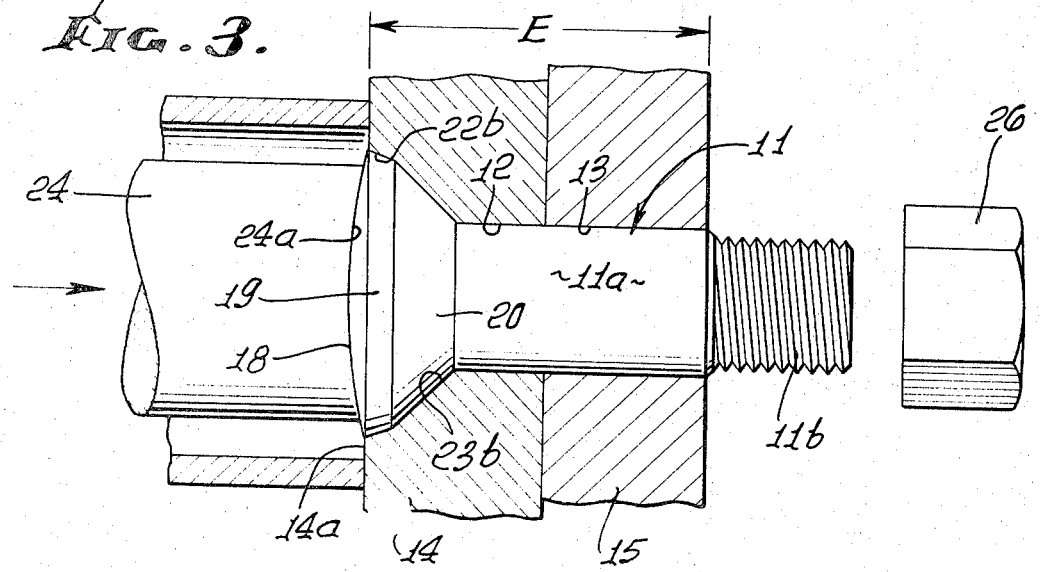
FIG. 3 is a view like FIG. 2.

The fastener 10 has an axially extending shank 11 receivable in bores 12 and 13 formed by work panels or sheets 14 and 15 to be interconnected. The fastener also has a head 16 receivable in forcible engagement with work material forming a tapered counterbore generally indicated at 17, and which is typically countersunk. The head extent that engages the counterbore is harder than the work material forming the counterbore, so that the latter is deformed to snugly fit the head when the latter is driven into position as seen in FIG. 3. For this purpose, the fastener may for example consist of steel containing suitable alloy or alloys (as for example chromium, nickel or molybdenum), or of titanium; and, the work may for example consist principally of aluminum or titanium, or aluminum or titanium alloys.

Figure 1:
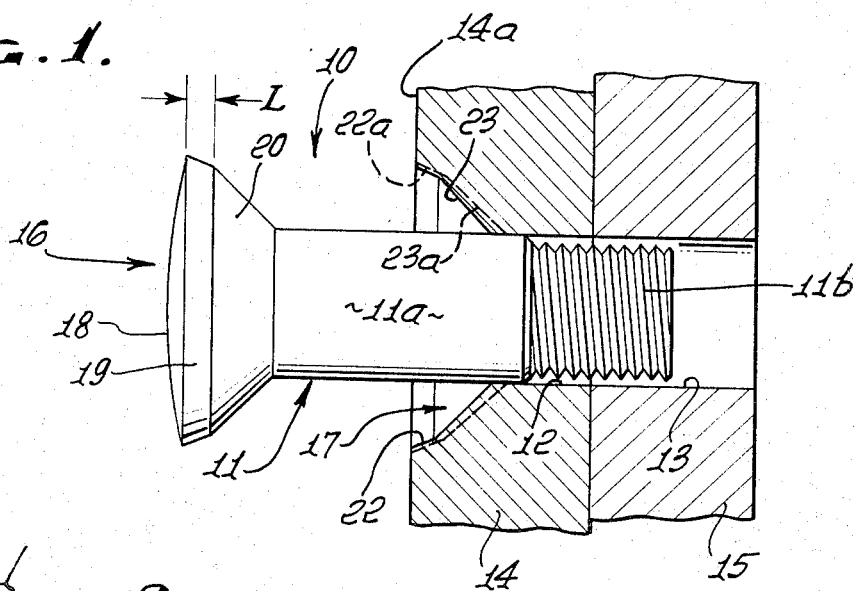
FIG. 1 is a side elevation showing a fastener embodying the invention as it is initially inserted into a work bore.
Figure 2:
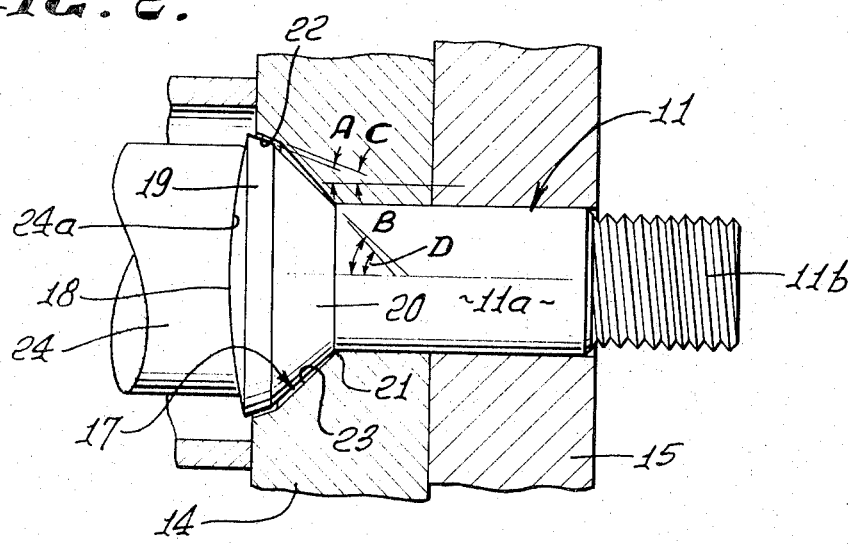
FIG. 2 is a view like FIG. 1, but showing the fastener after it has been partially seated.

The head 16 has an end face 18, a first forwardly tapered section 19 located immediately forwardly of the end face, and second forwardly tapered section 20 located forwardly of the first section. The taper angularity B of the second section substantially exceeds the taper angularity A of the first section, so that when the fastener shank is partially inserted into the work bore as seen in FIG. 1 (with interference fit as will be described), and a first impact is imparted to the head rear face, the fastener becomes partially seated as seen in FIG. 2. As there shown, only the forwardmost extent of the head initially engages the work counterbore, i.e., at 21, whereby a slight gap remains between the head section 19 and the counterbore first tapered surface 22, (of taper angularity C) and between the major extent of the head second section 20 and the major extent of the counterbore second tapered surface 23 (of taper angularity D(. That gap is filled by cold worked material during the second impact to be described. In certain cases a single impact serves to drive the fastener from FIG. 1 to FIG. 3 positions.

A striker to impact the head is indicated generally at 24 as having an end face 24a which is shallowly concave to match the shallow convexity of the head rear face 18, for centering the fastener. A tubular spacer 25 surrounds the striker, and engages the work. Such apparatus is described in detail in my copending application, Ser. No. 379,106 entitled, "Fastener Driving Gun." The construction of the fastener is such that it may normally be fully seated, as seen in FIG. 3, in response to one or two impacts imparted by such a striker, whereby there is no necessity for repeatedly striking the fastener head, thereby greatly reducing the noice level in aircraft frame assembly areas where large number of fasteners are being simultaneously driven. In this connection, the fastener shank 11 typically includes a primary section 11a extending forwardly of the head second section 20, and a secondary section 11b which is threaded and extends forwardly of the section 11a to receive a nut 26 to retain the fastener in work panel connecting position as seen in FIG. 3. The overall thickness dimension E of the work panel may typically vary from about 3/16 inch to 2 ½ inches.

For best results, and in regard to the fastener, the taper angularities A and C typically the same, and may vary between 4° and 10°; when A is about 4°, the length L of the first section is about 0.140 inches; when A is about 10° the length L is about 0.020 inches (i.e., the greater the angle A, the shorter the length L) and these two coordinates (4° and 0.140 inches) and (10° and 0.020 inches) define a line in a rectangular coordinate system which relates L to A.

In addition, the fastener head first section 19 has interference engagement with the counterbore surface 22 everywhere along the length of shoulder 19, the total amount of such interference being within the range 0.003 and 0.008 inch; and the fastener shank primary section 11a has interference engagement with the bores 12 and 13, the total amount of such interference likewise being within the range 0.003 and 0.008 inch.

Finally, the counterbore second taper D always exceeds taper B; at the annular corner where tapers 22 and 23 meet, (and which is engaged by the annular corner where tapers 19 and 20 meet) up to 0.004 inch of cold working of the material of panel 14 occurs; and at the corner where taper 23 meets bore 12, (which corner is engaged by the corner where taper 19 meets shank 11a) up to 0.012 inch of cold working of the panel material takes place; however the amount of cold work at the second mentioned corner is always greater than at the first mentioned corner so that the material cold works or extrudes in a direction from the corner where taper 23 meets bore 12 toward the corner where tapers 22 and 23 meet, and fills the gap.

The broken lines 22a and 23a in FIG. 1 show the ultimately deformed positions of the respective tapered surfaces 22 and 23 of the work. FIG. 3 shows the head first and second sections 19 and 20 having full sealing interference engagement with the work deformed first and second counterbore tapers 22b and 23b, respectively, to block intrusion of corrosive fluid from the work surface. Also, the fastener end face 18 is substantially flush with the work surfaces 14a.

It is a further feature that the fastener, once fully seated as described, can be removed and re-inserted in the same hole for retention by the nut, without requiring further driving by the striker.

A further advantage accruing from the invention concerns prevention of bowing or warping of the work panel. Such detrimental warpage has commonly occurred in the past where a number of conventional angle headed fasteners were driven into the work, each fastener having shank interference with its work bore, but no interference between the fastener head and the surrounding countersunk work material. The present invention provides interference with the work along both the head and the shank, so that significant warpage creating differential forces are not present along the length of the bore.

I claim:

1. In a fastener having an axially extending shank receivable in a work bore and a head receivable in forcible engagement with the work material forming a counterbore, the improvement comprising
   a. the head having an end face, a first forwardly tapered section located forwardly of said end face and a second forwardly tapered section located forwardly of the first section, the taper angularity of the second section substantially exceeding the taper angularity of the first section,
   b. the taper angularity of the first section being less than about 10°, and the axial length of the first section being within the range of 0.140 inches to 0.020 inches,
   c. and including the work wherein said counterbore has first and second tapers receiving the head first and second sections, the counterbore first taper substantially parallel to the taper of the head first section, and there being interference between the head first section and the counterbore first taper of between substantially 0.003 and 0.008 inches.

2. The fastener of claim 1 wherein said taper angularity of the first section is greater than about 4°.

3. The fastener of claim 1 wherein the fastener shank includes a primary section extending forwardly of the head second section, and a secondary section which is threaded and extends forwardly of the primary section.

4. The fastener of claim 3 wherein the shank primary section has interference engagement with the work bore.

5. The fastener of claim 1 wherein the head second section has sealing interference engagement with said work second counterbore taper.

6. The fastener of claim 1 wherein said end face is substantially flush with a plane defined by the surface of the work.

7. The fastener of claim 1 wherein said counterbore second taper has initial undeformed angularity which exceeds the forward taper angularity of said head second section.

8. The fastener of claim 7 wherein the head second section taper fully engages the counterbore second taper which is cold worked to match the angularity of the head second section taper, the outermost extent of the counterbore second taper being cold worked up to 0.004 inch, and the innermost extent of the counterbore second taper being cold worked up to 0.012 inch.

* * * * *